US008233929B2

(12) United States Patent
Lee et al.

(10) Patent No.: US 8,233,929 B2
(45) Date of Patent: Jul. 31, 2012

(54) METHOD FOR MANAGING ONE OR MORE MEDIA TYPES SUPPORTED IN A POC SESSION IN A WITHDRAWAL MESSAGE, AND A POC SYSTEM AND A POC USER EQUIPMENT FOR IMPLEMENTING THE SAME

(75) Inventors: Ji-Hye Lee, Seoul (KR); Sung-Jin Park, Suwon-si (KR); Wuk Kim, Gwacheon-si (KR); Eun-O Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1142 days.

(21) Appl. No.: 12/098,735

(22) Filed: Apr. 7, 2008

(65) Prior Publication Data
US 2008/0248762 A1   Oct. 9, 2008

(30) Foreign Application Priority Data
Apr. 5, 2007   (KR) .................. 10-2007-0033856

(51) Int. Cl.
*H04W 4/10* (2009.01)
(52) U.S. Cl. ...................................... 455/518
(58) Field of Classification Search ................. None
See application file for complete search history.

(56) References Cited

U.S. PATENT DOCUMENTS
5,590,127  A    12/1996  Bales et al.
7,899,444  B2 *  3/2011  Hans et al. ............ 455/518 X
2005/0124365 A1  6/2005  Balasuriya et al.

FOREIGN PATENT DOCUMENTS
JP    9-36917  A    2/1997
(Continued)

OTHER PUBLICATIONS
M. Garcia-Martin, A Session Initiation Protocol (SIP) Event Package and Data Format for Various Settings in Support for the Push-to-Talk over Cellular (PoC) Service, RFC4354, Nokia, The Internet Society, Jan. 2006.

*Primary Examiner* — Philip Sobutka
(74) *Attorney, Agent, or Firm* — Jefferson IP Law, LLP

(57) ABSTRACT

A PoC system, method, user equipment and server used for managing one or more media types supported in a PoC session opened between a PoC server and one or more PoC clients is provided. When at least one PoC client is engaged in a Open Mobile Alliance (OMA) Push-to-talk (PPT) over Cellular (PoC) multimedia communication service and is to be withdraw from a PoC session in which the PoC client is participating, a PoC server identifies and stores information about one or more media types that were negotiated to be usable between the corresponding PoC client and the PoC server when the corresponding PoC client joined the PoC session. Next, when the number of PoC clients using the identified one or more media types among remaining PoC clients participating in the PoC session is one or less, the PoC server determines that the identified one or more media types is no longer needed for the corresponding PoC session, and corrects the PoC session so as to not use the identified one or more media types. Accordingly, when the one or more media types will not be received by any PoC client in the PoC session the use of the one or more media types in the PoC session is discontinued, so that it is possible to prevent a transmission error of the corresponding one or more media types and to save resources allocated to the corresponding one or more media types.

18 Claims, 8 Drawing Sheets

FOREIGN PATENT DOCUMENTS

| | | |
|---|---|---|
| JP | 2005-109784 A | 4/2005 |
| JP | 2007-49382 A | 2/2007 |
| KR | 1020060031535 A | 4/2006 |
| WO | 2005043944 A1 | 5/2005 |

* cited by examiner

METHOD FOR MANAGING ONE OR MORE MEDIA TYPES SUPPORTED IN A POC SESSION IN A WITHDRAWAL MESSAGE, AND A POC SYSTEM AND A POC USER EQUIPMENT FOR IMPLEMENTING THE SAME

PRIORITY

This application claims the benefit under 35 U.S.C. §119(a) of a Korean patent application filed in the Korean Industrial Property Office on Apr. 5, 2007 and assigned Serial No. 2007-33856, the entire disclosure of which is hereby incorporated by reference.

BACKGROUND OF THE INVENTION

1. Field of the Invention

The present invention relates to a method for managing a media type supported in a Push-to-talk (PTT) Over Cellular (PoC) session, and a PoC system and a PoC User Equipment (UE) for implementing the same. More particularly, the present invention relates to a method for, when a specific PoC client participating in a PoC session withdraws from the PoC session, processing one or more media types that were negotiated to be usable by the specific PoC client while participating in the PoC session, and a PoC system and a PoC UE for implementing the same.

2. Description of the Related Art

Development of mobile communication technologies and the expansion of communication networks have led to the provision of various services and applications which use mobile telephones. In addition to the basic voice communication service, users are demanding more diversified services, including a positioning service, a multimedia service, and a Push to Talk (PTT) service. In particular, the PTT service supports various supplementary functions such as instant messenger and status display, as well as group and voice communications, which have been provided by conventional radio transmitters or trunked radio systems (TRSs).

Efforts have been made to establish a standard for the PTT over Cellular (PoC) service which employs such a PTT function in a mobile communication network. One feature of the PoC service that is different from the conventional mobile communication service is that it belongs to a plurality of sessions so that the user can communicate while moving between sessions if necessary. The requirement that a user must be able to communicate while moving between a plurality of PoC sessions, that is, the requirement for a multi-session function, are specified by the Open Mobile Alliance (OMA). The OMA is a forum for defining standards for mobile communication services.

The PoC V2.0 system supports a PoC multimedia communication service. To this end, the PoC V2.0 system defines new types of multimedia, such as video, audio and text, in addition to voice. When a PoC session is opened, a media type to be used in the PoC session is determined through negotiations between a PoC server and a PoC client. In addition, it is possible in the current PoC system to display multi-streams, such as video or images, due to advancements made in the capabilities of user equipment.

The multimedia mentioned above is formed with a combination of one or more media types. "Media type" may refer to various types of media, for example, audio such as music, video such a moving picture, an image such as s still picture/ photograph, text, and a file, as well as voice specified as speech or PoC speech, and also may refer to a plurality of the same types of media streams.

When a PoC session is opened in the PoC system supporting a plurality of media types as described above, the PoC server opens the PoC session permitting any combination of the media types to be used by PoC clients that participate in the PoC session. In other words, when a PoC session is opened, various media types supportable in the PoC session are obtained through negotiations. In addition, the negotiation of the media types which can be supported in the PoC session is carried out again when another PoC client participates in the PoC session after the PoC session has been opened.

After a PoC session is opened through the negotiation of media types, as described above, one or more media types to be actually used in the PoC session must be supported by at least two PoC clients so that transmission and reception of the one or more media types may be meaningful. However, according to the conventional PoC system, one or more media types to be supported in a PoC session are managed in such a manner as to carry out negotiation of media types only upon opening a PoC session or joining an ongoing PoC session.

If one or more participating PoC clients withdraw from the PoC session, and only one PoC client which uses one or more media types used by the withdrawn one or more PoC clients in the PoC session remains, there will be no PoC client left that is able to receive the corresponding one or more media types.

Consequently, even though a PoC client remains that can transmit media in the corresponding one or more media types, there are no PoC clients that can receive the one or more media types, thereby causing error and waste of resources.

SUMMARY OF THE INVENTION

An aspect of the present invention is to address at least the above-mentioned problems and/or disadvantages and to provide at least the advantages described below. Accordingly, an aspect of the present invention is to provide a method for, when a specific PoC client participating in a PoC session withdraws from the PoC session, processing one or more media types negotiated to be usable by the specific PoC client during participation in the PoC session, and a PoC system and a PoC user equipment for implementing the same.

Another aspect of the present invention is to provide a method in which a PoC client withdrawing from a PoC session transmits a withdrawal message with information about his/her own one or more media types that were negotiated to be usable. A PoC server then identifies the media type information of the corresponding PoC client and corrects the PoC session to a session so as to discontinue the use of the corresponding one or more media types, when only one or no PoC clients can use the corresponding one or more media types, and a PoC system and a PoC user equipment for implementing the same.

In accordance with an aspect of the present invention, a PoC system for managing one or more media types supported in a PoC session opened between a PoC server and one or more PoC clients is provided. The PoC system includes the one or more PoC clients, each of at least one of the one or more PoC clients for inserting information about one or more media types, which are usable by the respective PoC clients while participating in the PoC session, into a withdrawal message for withdrawing from the PoC session, and for transmitting the withdrawal message, and the PoC server for identifying and storing the one or more media types from the media type information included in the withdrawal message when the withdrawal message is received, and for correcting the PoC session in such a manner as to exclude the identified one or more media types from among one or more media types used in the current PoC session when a number of remaining PoC clients using the identified one or more media types is one or less.

In accordance with another aspect of the present invention, a method for managing one or more media types supported in a PoC session opened between a PoC server and one or more PoC clients in a PoC system including the PoC server and the PoC clients is provided. The method includes inserting, by at least one PoC client of the PoC clients, information about one or more media types, which are usable by each of at least one PoC client while participating in the PoC session, into a withdrawal message for withdrawing from the PoC session, transmitting the withdrawal message to the PoC server, identifying and storing, by the PoC server, the one or more media types from the media type information included in the withdrawal message when the PoC server has received the withdrawal message, determining, by the PoC server, if a number of remaining PoC clients using the identified one or more media types is one or less, and correcting, by the PoC server, the PoC session in such a manner as to exclude the identified one or more media types from among one or more media types used in the PoC session when the number of remaining PoC clients using the identified one or more media types is one or less.

In accordance with still another aspect of the present invention, a PoC user equipment for implementing management of one or more media types supported in a PoC session in a PoC system is provided. The PoC user equipment includes a user interface for outputting a signal according to an input of a PoC user, a data transmitter for at least one of transmitting and receiving packet data, and a PoC client for transmitting a PoC session withdrawal message which includes information about one or more media types supportable by the PoC client to the PoC server through the data transmitter, when a PoC user inputs a PoC session withdrawal request through the user interface while the PoC is participating in the PoC session.

In accordance with yet another aspect of the present invention, a PoC server for managing one or more media types supported in a PoC session opened between the PoC server and one or more PoC clients is provided. The PoC server includes the PoC server for receiving a withdrawal message comprising media type information corresponding to one or more media types which are usable by the respective PoC client while participating in the PoC session, for identifying and storing the one or more media types from the media type information included in the withdrawal message, and for correcting the PoC session in such a manner as to exclude the identified one or more media types from among one or more media types used in the current PoC session when a number of remaining PoC clients using the identified one or more media types is one or less.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

First, an exemplary a Push-to-Talk (PTT) over Cellular (PoC) system to which exemplary embodiments of the present invention are applied will now be described with reference to FIGS. 1 to 3. The following description will be given with respect to the case in which exemplary embodiments of the present invention are applied to a PoC system, which provides a PTT service using a cellular mobile communication network from among PTT systems. A PoC system may use a session initiation protocol (SIP) and a SIP extension protocol in order to transfer session participation information of a group communication, and may use an XML configuration access protocol (XCAP) in order to acquire group information. The following exemplary embodiments of the present invention may be implemented by the above-mentioned protocols, and the construction of exemplary embodiments of the present invention may be based on the PoC Rel. 1 system. The following description will be given with respect to an exemplary PoC system, to which exemplary embodiments of the present invention are applied.

Figure 1:
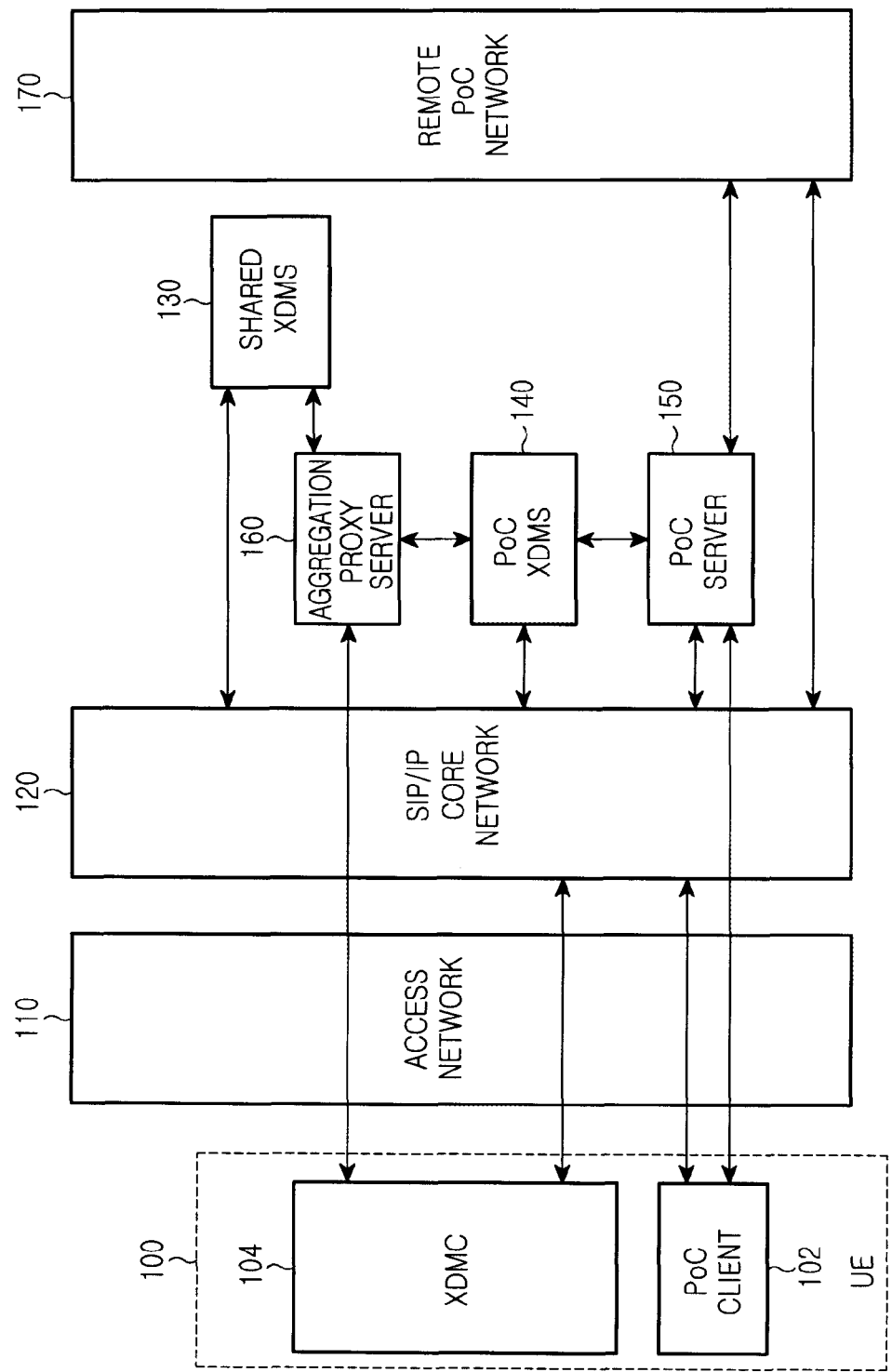
FIG. 1 is a block diagram illustrating a configuration of a PoC service system to which an exemplary embodiment of the present invention is applied.

FIG. 1 is a conceptual view illustrating a construction of an exemplary PoC service system and a network relative to the system.

The exemplary PoC system may include a PoC user equipment (UE) 100, Extensible Markup Language (XML) Document Management Servers (XDMSs) 130 and 140, and a PoC server 150. In addition, the PoC system may further include an aggregation proxy server 160. The aforementioned components may be connected to each other through an access network 110, a SIP/IP core network 120 and a remote PoC network 170.

The respective components will now be described.

The PoC UE 100 may include a PoC client 102 and an XML Document Management (XDM) client 104.

The PoC client 102, which represents a service requester contained in the PoC UE 100, resides in the PoC UE 100 and performs a network access so as to provide a PoC service subscriber with a PoC service. The PoC service subscriber may be provided with a PoC service through the PoC UE containing the PoC client. In the following description, "PoC client" will be used as a term for a PoC service subscriber and the UE including a PoC client. Also, the reference numeral of the PoC client will be omitted unless a specific distinction is required.

The main functions of the PoC client are to establish, participate in and terminate a PoC session, in view of a PoC service subscriber (i.e., a PoC user). In addition, the PoC client creates and transfers a talk burst, supports an instant personal alert and performs authentication when accessing a PoC service. The PoC client may be connected to the SIP/IP core network 120, which supports SIP/IP multimedia, through the access network 110.

The SIP/IP core network 120 is connected to the PoC server 150 and the XDMSs 130 and 140 in order to support the PoC service. In this case, the PoC server 150 performs a controlling PoC function for maintaining a PoC session, or performs a participating PoC function for participating in a PoC session for a point-to-point communication or a multipoint communication.

Meanwhile, a PoC service may be accompanied with a service which creates a group session such as a conference communication. To this end, the OMA standard defines the XDMSs 130 and 140 and the XDM client 104 for a group list service. The construction shown in FIG. 1 includes a PoC XDMS 140 used for a PoC service and a shared XDMS 130, which can be shared, even in other service enablers. Information about a group and a group member may be stored in the XDMSs 130 and 140 through the PoC client. The PoC client can understand information about other PoC clients, which the PoC client itself can call, through an individual or a group list received from the XDMSs 130 and 140. Meanwhile, the generation, correction and management of the group and group members in the XDMSs 130 and 140 may be performed through a reliable communication network by the PoC service provider, such as the Internet or an Intranet. Detailed descriptions of protocols and particular content for XML text management, such as creation, correction and deletion of a group list, will be omitted.

For a group service, upon receiving a group list-related request from the XDM client 104, the aggregation proxy server 160 routes the request to the XDMSs 130 and 140 according to appropriate rules.

The PoC server 150 will now be described.

Figure 2:
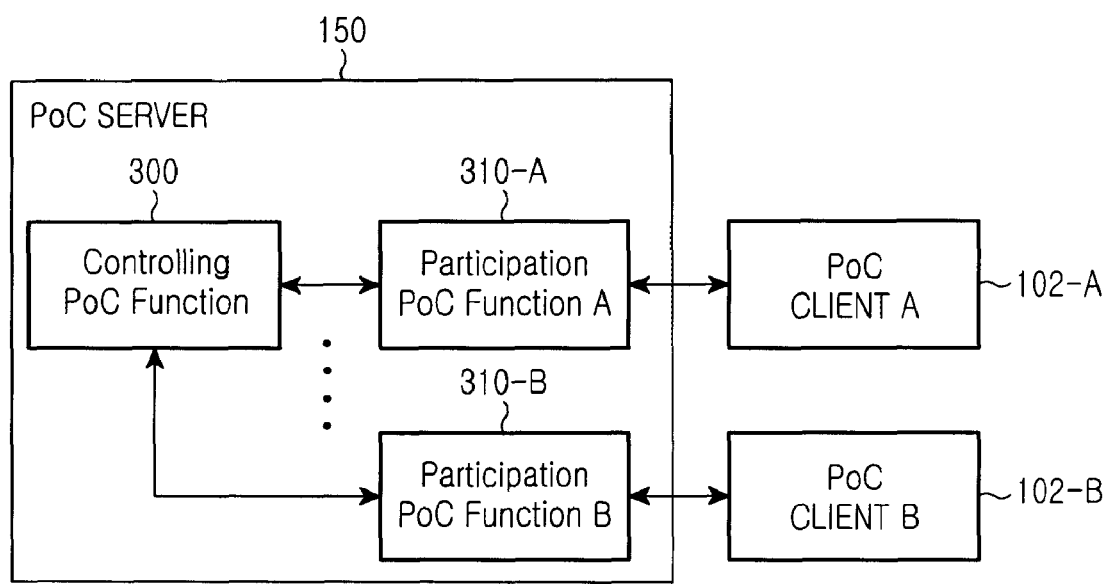
FIG. 2 is a block diagram illustrating the functions of an exemplary PoC server.
Figure 3:
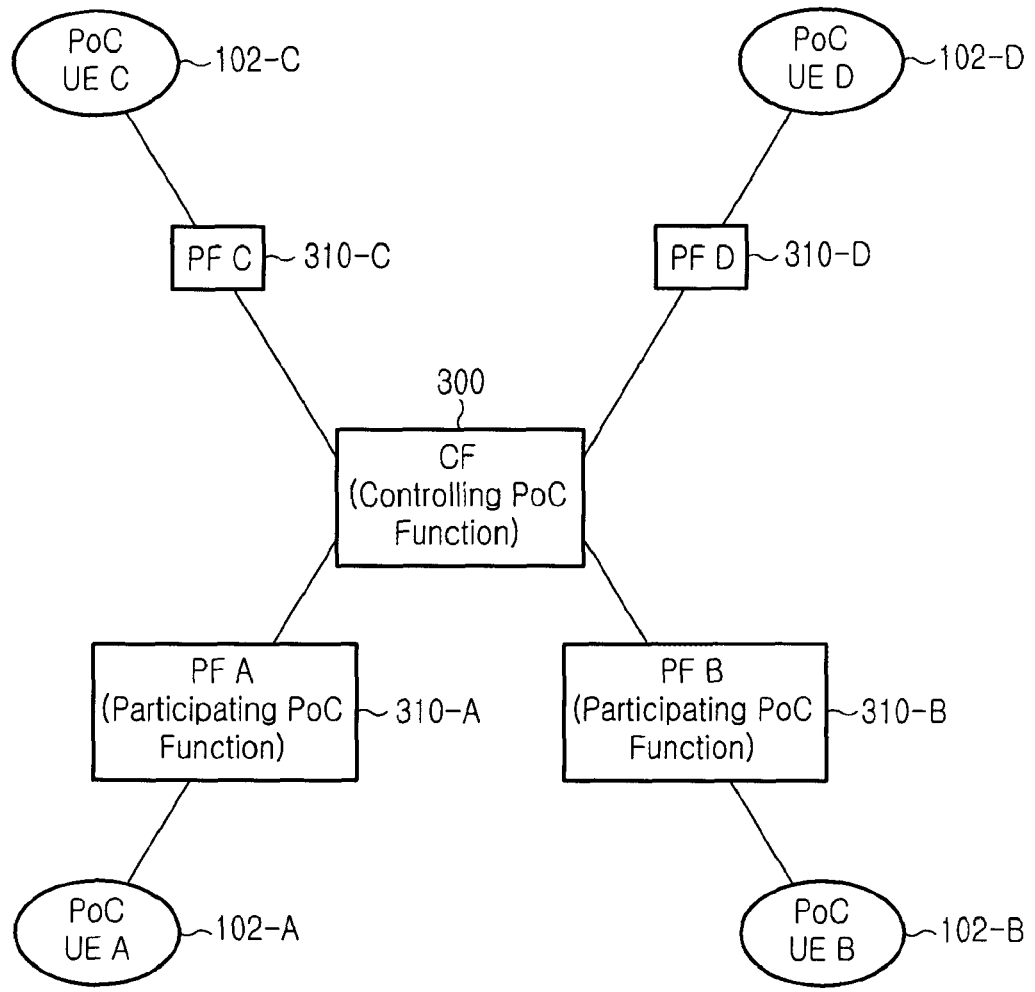
FIG. 3 is a block diagram illustrating a controlling PoC function block and a participating PoC function block in a PoC server.

FIG. 2 is a block diagram illustrating the construction of an exemplary PoC server.

The functions of the PoC server 150 may be classified into a controlling PoC function (CF) 300 for maintaining a PoC session and a participating PoC functions (PFs) 310-A and 310-B for handling the maintenance for each PoC session, such as with corresponding PoC client A 102-A and PoC client 102-B. The characteristics according to each function of the PoC server will be described with reference to Tables 1 and 2.

TABLE 1

Controlling PoC Function (CF)

Provides centralized PoC session handling
Provides the centralized Media distribution
Provides the centralized Talk Burst Arbitration functionality including talker identification
Provides SIP session handling, such as SIP session origination, termination, etc.
Provides policy enforcement for participation in group sessions
Provides the participants information
Collects and provides centralized media quality information
Provides centralized charging reports
May provide transcoding between different codecs
Support Talk Burst Control Protocol Negotiation As shown in Table 1, the CF performs a function of managing PoC sessions among the functions of the PoC server. In particular, the PoC server receives requests for the floor from PoC clients, arranges an order in which to give the clients the floor, and gives the clients the floor in that order. The PoC server also distributes a talk burst from a specific PoC client to all PoC clients participating in a group PoC call, and provides information about the PoC clients participating in the group PoC call.

As shown in Table 2 below, the PF manages sessions connected between a CF and each PoC client during a PoC session. In particular, the PF relays a request for the floor transmitted from a PoC client, and relays the floor given from the CF to the PoC client. Also, the PF performs a media relay function between the CF and the PoC client, in such a manner that the PF provides a transcoding function when the CF and the PoC client use different codecs. In addition, the PF provides a filtering function for filtering one voice according to the choice of the PoC user when voice communication is performed in a session while voice communication is being performed in another session during multiple simultaneous PoC sessions.

TABLE 2

Participating PoC Function (PF)

Provides PoC session handling
May provide the Media relay function between PoC Client and Controlling PoC server
May provide user media adaptation procedures
May provide the Talk Burst control message relay function PoC Client and Controlling PoC server
Provides SIP session handling, such as SIP session origination, termination, etc., on behalf of the represented PoC Client
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 is a block diagram illustrating a controlling PoC function block and a participating PoC function block in a PoC server.

PoC clients 102-A to 102-D are connected to CF 300 through corresponding PFs 310-A to 310-D, and establish respective PoC sessions. Thereafter, media for a corresponding talk burst of a PoC client that has been granted the floor from the CF 300, is sent to each of other PoC clients. In this case, the PoC client that has the floor can talk only after having checked information of PoC clients participating in the group session.

A PoC multimedia session open procedure in the aforementioned PoC system will now be described.

A sending-side PoC client requests a call processing by transmitting a request message for participating in a multimedia (e.g. audio, video, and text in various formats according to appointed media types) session by means of a SIP protocol. In response to the call processing request, a receiving-side client performs various response procedures depending on a response mode set up in the corresponding PoC server and on whether a pre-established session exists therein. The call processing procedure for PoC communication will be described by way of an example in which a single network is used for both the sending side and the receiving side. However, a different network may be used for each of the sending side and the receiving side.

A sending-side PoC client sends a SIP INVITE request including SIP address information of a receiving-side PoC client, with whom the sending-side PoC client desires to communicate, to a corresponding SIP/IP core network. In this case, a SIP INVITE message may further include elements, such as PoC address information of the sending-side PoC client, a required one or more media parameters, and characteristic value information identifying a PoC service. Herein, the one or more required media parameters may include a one or more of characteristic values such as rate, payload type, and an encoding method for audio and video, when the required session is related to multimedia.

The SIP INVITE message is transferred to a participating PoC server via corresponding IMS servers (i.e., a proxy-call server control function (P-CSCF) and a serving-call server control function (S-CSCF)) in the IMS network, through a path query in a dynamic host configuration protocol (DHCP) server or a domain name server (DNS). When a general communication is requested, the participating PoC server connected to the PoC client can be constructed separately from the controlling PoC server managing a talk burst of the opened session, so that the SIP INVITE request received by the PF is transferred to the CF via the SIP/IP core network of a corresponding network.

Meanwhile, a PoC session controlling network including a CF transfers a SIP INVITE request message to the receiving-side network, and then receives a response message from the receiving-side network. The SIP message responding from the receiving-side network may be a 1xx provisional response message, a 2xx successful response message, or one of 4XX to 6XX error response messages, according to setup of the PF and the receiving-side PoC client. In the auto-answer mode, a SIP 183 Session Progress signal may be received as a response message, through which a connection between the PoC server and the client can take place in an IMS network of a communication requester. A communication permission signal of the receiving-side PoC client is sent as a SIP 183 Session Progress or a SIP 200 OK response, and transmitted to the PoC client via the PoC server of the CF and PF. When the 200 OK response or 183 Session Progress signal has been received from the receiving-side PoC server, the CF determines that a PoC call has been connected, and sends the sending-side PoC client a Floor Granted signal to grant the floor for a talk burst. Granting the floor for a talk burst according to the response, that is, according to the SIP 200 OK or 183 Session Progress signal, may be identified by using "confirmed" or "unconfirmed." The CF according to the present invention needs a buffering function when receiving a response of "unconfirmed."

Meanwhile, after having received a response signal to the SIP INVITE request signal, the sending-side PoC client receives a Floor Granted signal to transfer a talk burst transmission permission signal (e.g. call connection sound) through a real time control protocol (RTCP). The Floor Granted signal is created by the CF having a talk burst negotiation right, and transferred to the PoC client via the PF managing the corresponding PoC client. In this case, since the Floor Granted signal does not use the SIP protocol but uses a path of a bearer, the Floor Granted signal can be transmitted without passing through a SIP/IP core network, such as the IMS. The PoC client who has confirmed the call connection sound transfers a media (e.g. voice) stream using a real-time transport protocol (RTP).

Figure 4:
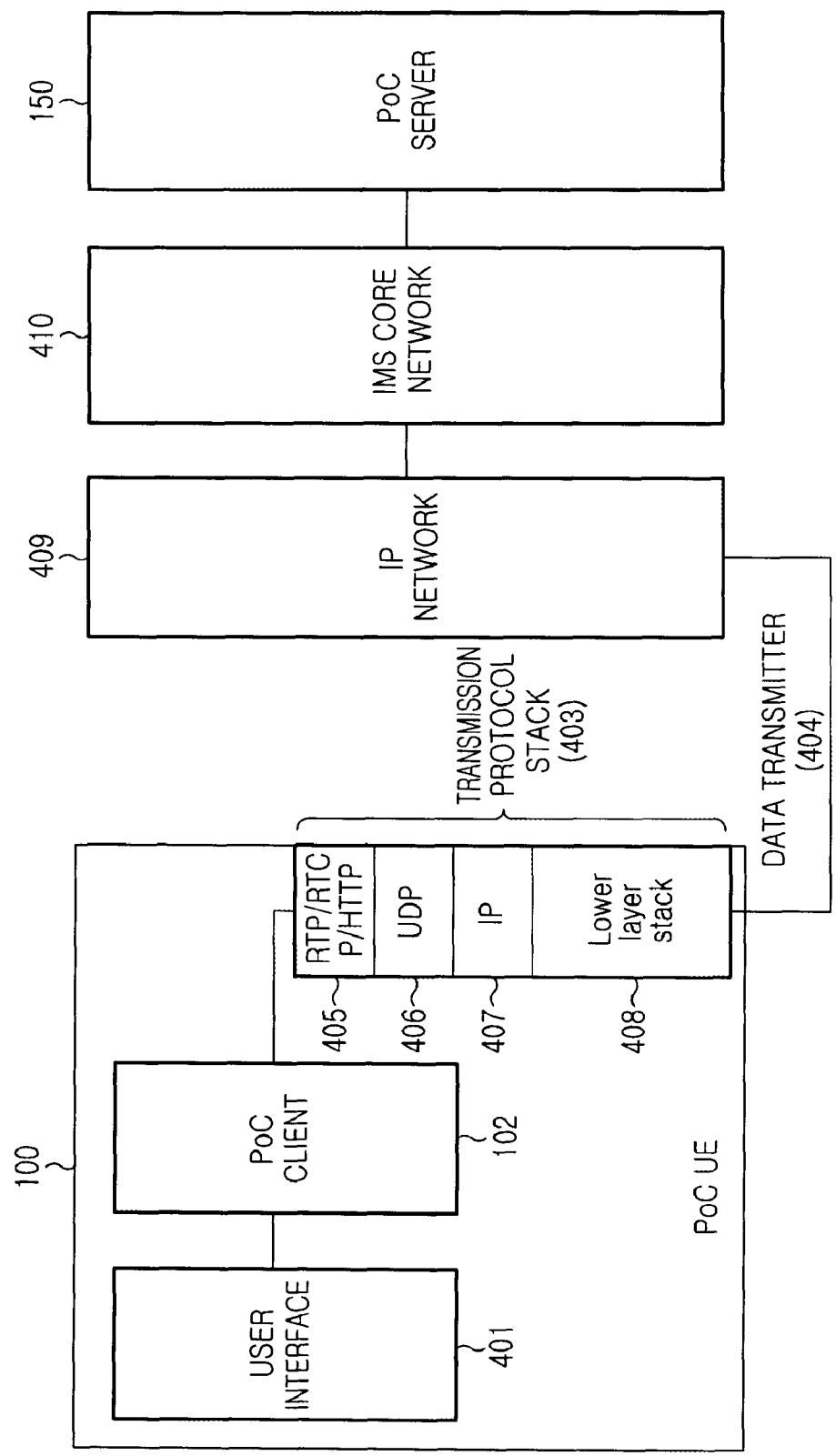
FIG. 4 is a block diagram schematically illustrating a connection between a PoC server and a general PoC user equipment (UE) including a PoC client.

FIG. 4 is a block diagram schematically illustrating a connection between the PoC server 150 and a PoC UE 100 including a PoC client 102 according to an exemplary embodiment of the present invention.

The PoC UE 100 includes a PoC client 102, a user interface 401 and a data transmitter 402.

In more detail, when a PoC user requests a PoC session withdrawal through the user interface 401 while the PoC client 102 according to an exemplary embodiment of the present invention is participating in a PoC session, the PoC client 102 transmits a PoC session withdrawal message to a corresponding PoC server 150. The PoC session withdrawal message includes information about his/her own supportable one or more media types, that is, including information about the one or more media types established through negotiations with the PoC server 150 to be usable when participating in the session.

The user interface 401 transfers a user input to the PoC Client 102. The data transmitter 404 transmits and receives packet data. The data transmitter 404 may include one or more transmission protocol stacks 403 for transmitting/receiving packet data. In an exemplary transmission protocol stack 403, the transmission protocol stack may include a RTP/RTCP/HTTP layer 405, a UDP layer 406, an IP layer 407, and a Lower Layer Stack layer 408. The data transmitter 404 may transmit/receive packet data with the PoC server 150 via an IP network 409 and IMS core network 410.

The PoC server 150 will now be described. When receiving a withdrawal message from the PoC UE 100, the PoC server 150 identifies and stores media type information included in the withdrawal message. Next, when the number of remaining PoC clients using the identified one or more media types is one or less, the PoC server 150 corrects the current session to a session that continues to use the currently used one or more media types except for the identified one or more media types. In addition, when the number of remaining PoC clients using the identified one or more media types is one or less, the PoC server 150 initiates a timer set for a preset time. Thereafter, the PoC server 150 performs a control operation such that the one or more media types used in the current PoC session can be supported as they are when a new PoC client using the identified one or more media type has joined the PoC session before the timer has reached the preset time.

In contrast, when a new PoC client using the identified one or more media types does not join the PoC session until the timer has reached the preset time, the PoC server 150 corrects the current session to a session using the currently used one or more media types except for the identified one or more media types. When the number of remaining PoC clients using the identified one or more media types is two or more, the PoC server 150 controls all of the media types to continue be used in the current PoC session. In contrast, when the number of remaining PoC clients using the identified media type is one or less, the PoC server transmits a session correction message for deleting the identified one or more media types from the PoC session, to the remaining PoC client. Thereafter, when receiving a final response message from the remaining PoC client, the PoC server corrects the current session to a session using one or more media types that excludes the identified one or more media types. In this case, either a SIP re-INVITE message or a SIP UPDATE message may be used as the session correction message transmitted from the PoC server 150. The control operation of the PoC server 150, as describe above, will be described in greater detail with reference to FIG. 7.

Figure 5:
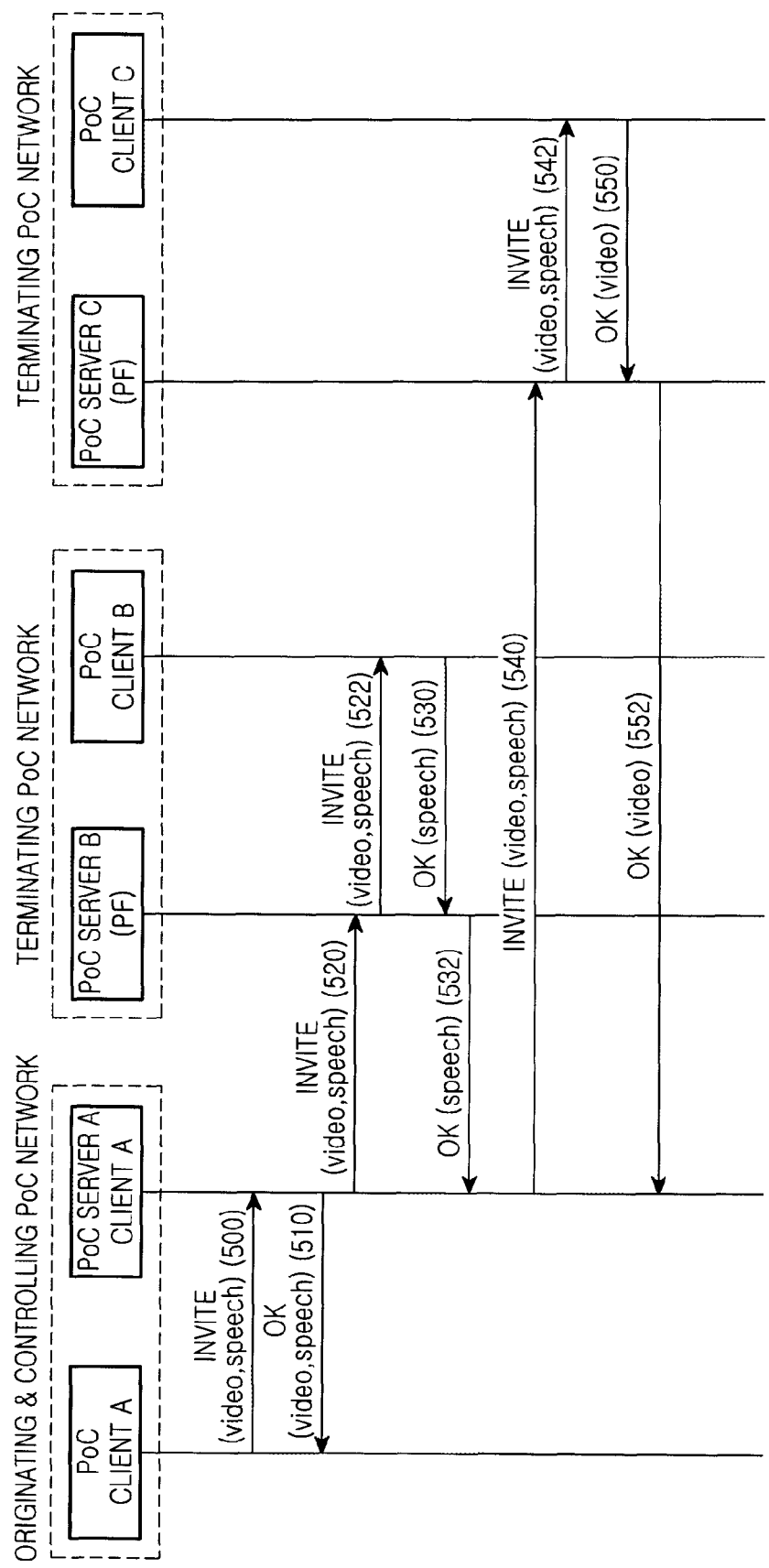
FIG. 5 is a flow diagram illustrating an exemplary procedure of opening a PoC session according to a media type negotiation between a PoC server and a PoC client participating in the PoC session.

FIG. 5 is a flow diagram illustrating an exemplary procedure of opening a PoC session according to a result of a media type negotiation between a PoC server and PoC clients participating in a PoC session. For the example illustrated in FIG. 5, it is assumed that PoC client A supports video and speech media types, PoC client B supports a speech media type, and PoC client C supports a video media type.

In step 500, PoC client A inserts information about media types supported by PoC client A into an INVITE message for opening a session, and then transmits the INVITE message to the PoC server. Since PoC client A supports the video and speech media types in this example, the INVITE message includes information representing that PoC client A supports the video and speech media types.

Thereafter, in step 510, the PoC server transmits a final response message (i.e. OK message) for permitting a session providing all of the one or more media types requested by PoC client A to be opened, so that a PoC session supporting the video and speech media types is opened between PoC client A and the PoC server.

Thereafter, through steps 520 and 522, and steps 540 and 542, the PoC server transfers a session INVITE message to receiving-side PoC clients, i.e., PoC client B and PoC client C.

Then, in this example, PoC client B inserts information representing that PoC client B supports the speech media type into a final response message (i.e. OK message) for permitting PoC client B to join the PoC session, and transmits the OK message to the PoC server in steps 530 and 532. Next, a session in which only a speech media type can be transmitted/received is connected between PoC client B and the PoC server.

Also, in this example, PoC client C inserts information representing that PoC client C supports the video media type into a final response message (i.e. OK message) for permitting PoC client C to join the PoC session, and transmits the OK message to the PoC server in steps 550 and 552. Then, a session in which only a video media type can be transmitted/received is connected between PoC client C and the PoC server.

The PoC server may perform step 510 after receiving a final response message from the entire or a part of receiving-side PoC clients in step 532 and/or step 552. When the PoC server receives a final response message for permitting only a speech media type from PoC client B, as in step 532, the PoC server may open a session in which only a speech media type is permitted with respect to PoC client A, or may open a session in which all media types requested by PoC client A are permitted by taking into consideration a PoC client to join therein in the future.

A exemplary procedure in which the PoC server manages media types supported in a PoC session when a PoC client participating in the PoC session is to withdraw from the PoC session, after the PoC session has been opened through a negotiation for the one or more media types supported in the PoC session, as described above, will be described with reference to FIG. 6.

Figure 6:
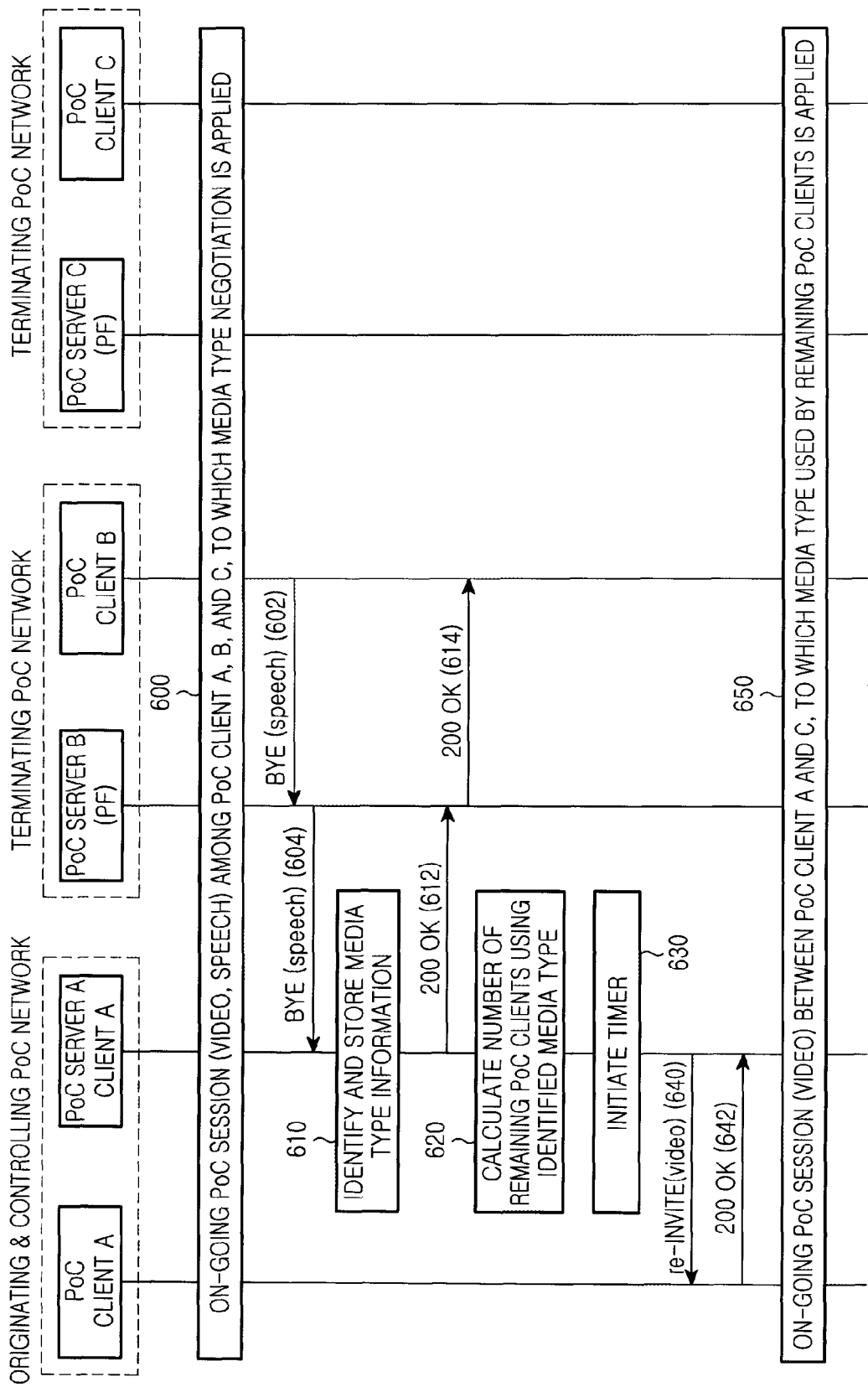
FIG. 6 is a flow diagram illustrating a procedure in which a PoC server manages one or more media types supported in a PoC session when a PoC client participating in the PoC session withdraws from the PoC session, according to an exemplary embodiment of the present invention.

FIG. 6 is a flow diagram illustrating an exemplary procedure in which a PoC server manages one or more media types supported in a PoC session when a PoC client participating in the PoC session withdraws from the PoC session.

First, in step 600, a PoC session to which a result of a media type negotiation between the PoC server and PoC clients A, B and C has been applied, as described with reference to FIG. 5. Accordingly, in this example, the PoC server manages video and speech media types in the entire PoC session, and PoC client A can transmit/receive both video media and speech media. In addition, in this example, PoC client B can transmit/receive only the speech media and PoC client C can transmit/receive only the video media.

Thereafter, in steps 602 and 604, PoC client B inserts information about the media type used by PoC client B into a withdrawal message (i.e. BYE message) for withdrawing from the PoC session, and transmits the withdrawal message to the PoC server.

Then, in step 610, the PoC server identifies and stores information about the media type which PoC client B who will withdraw has negotiated to use at the time of joining the PoC session, and transmits a final response message (OK message) to PoC client B in steps 612 and 614.

Thereafter, in step 620, the PoC server calculates the number of remaining PoC clients using the corresponding media type based on the media type information of PoC client B requesting withdrawal from the session, which has been stored in step 610.

When the number of remaining PoC clients using the corresponding media type is one or less, the PoC server determines that there exists no PoC client capable of receiving the corresponding media type any more. Thereafter, in step 630, the PoC server initiates a timer in order to wait for a new PoC client to join the PoC session before beginning a session correction to delete the corresponding media type.

When a new PoC client using the media type has joined the corresponding PoC session in step 630, the PoC server does not begin the session correction. In contrast, if a new PoC client using the media type has not joined the PoC session within a preset time in step 630, the PoC server proceeds to step 640 in which the PoC server performs a correction operation for the one or more media types supported by the PoC session.

In step 640, the PoC server transmits a session correction message (i.e. re-INVITE message) including a video media type, which is used by at least two PoC clients among remaining PoC clients, to PoC client A, the session of which must be corrected. That is, through step 640, the PoC server informs a PoC client using the video media type that there is no PoC client capable of receiving the video media type. Meanwhile, in step 640, a SIP UPDATE message may be used instead of the SIP re-INVITE message used for the session correction.

Thereafter, when receiving the session correction message for deleting the video media type in step 640, PoC client A transmits a final response message (OK message) to the PoC server in step 642. When receiving the final response message, the PoC server begins a session in which the video media type can be transmitted/received between the PoC server and the remaining PoC clients A and C in step 650.

Accordingly, in this example, the session between the PoC server and PoC client A is refreshed to a session in which only the video media type can be transferred.

A exemplary procedure in which PoC client B transmits a withdrawal message to the PoC server in order to withdraw from the PoC session, as described with reference to FIG. 6, will now be described with reference to FIG. 7.

Figure 7:
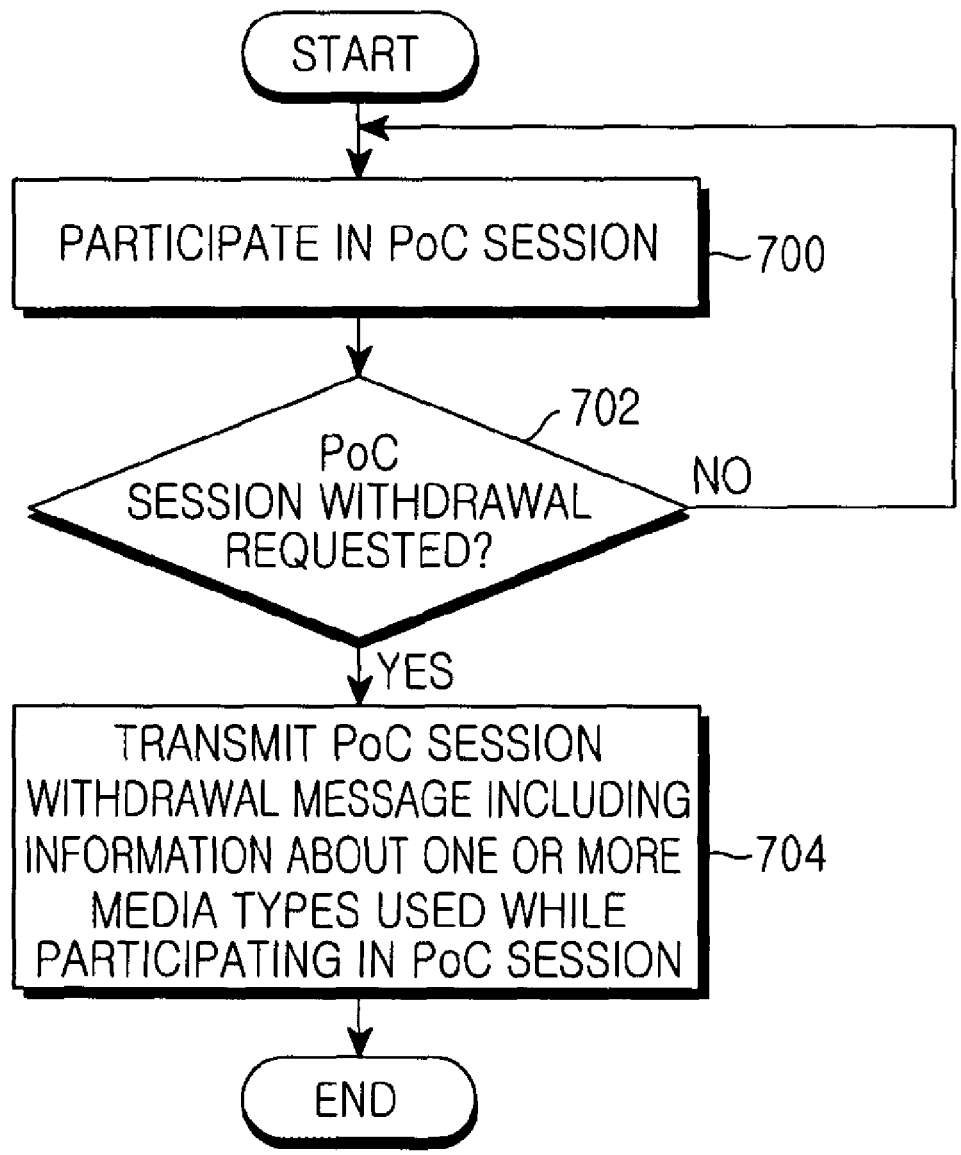
FIG. 7 is a flowchart illustrating a procedure in which a PoC client withdraws from a PoC session according to an exemplary embodiment of the present invention.

FIG. 7 is a flowchart illustrating an exemplary procedure in which a PoC client withdraws from a PoC session.

In step 700, PoC client B participates in a PoC session. Thereafter, when there is a PoC session withdrawal request from a PoC user in step 702, PoC client B proceeds to step 704, in which PoC client B transmits a PoC session withdrawal message which includes information about a media type which can be supported by PoC client B, that is, information about a media type that was negotiated with the PoC server to be useable when participating in the PoC session, to the corresponding PoC server.

Hereinafter, an exemplary procedure in which the PoC server manages one or more media types supported in the PoC session as a PoC session participant withdraws from the PoC session, as described with reference to FIG. 6, will be described with reference to FIG. 8.

Figure 8:
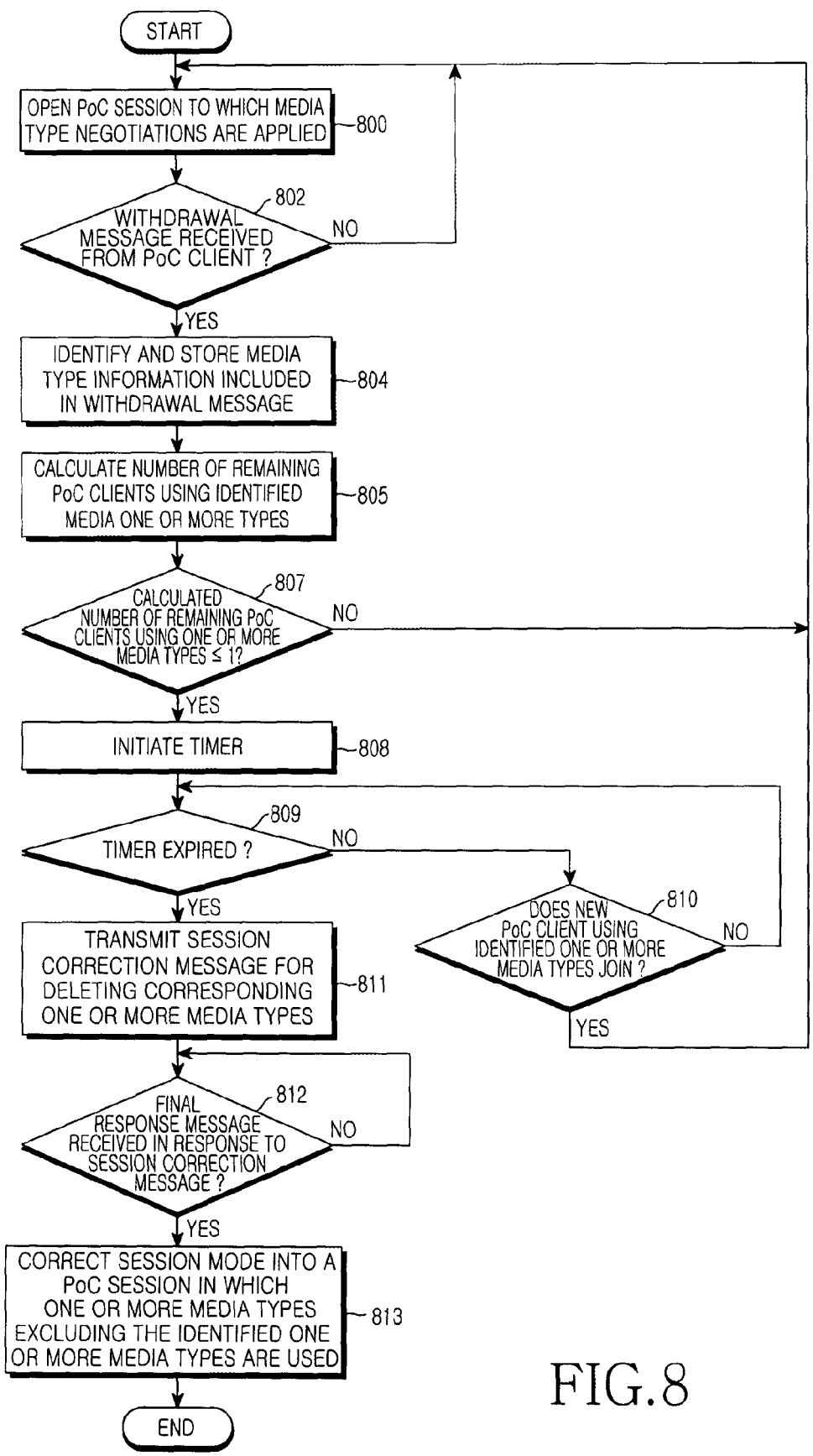
FIG. 8 is a flowchart illustrating a procedure in which a PoC server manages one or more media types supported in a PoC session as a PoC session participant withdraws from the PoC session according to an exemplary embodiment of the present invention.

FIG. 8 is a flowchart illustrating a procedure in which a PoC server manages one or more media types supported in a PoC session as a PoC session participant withdraws from the PoC session.

In step 800, the PoC server opens a PoC session in which results of media type negotiations have been applied. Thereafter, the PoC server determines if a withdrawal message including media type information is received from a PoC client.

If the PoC server receives a withdrawal message including media type information from a PoC client in step 802, the PoC server proceeds to step 804, but if it does not, the PoC server returns to step 800.

Thereafter, in step 804, the PoC server identifies and stores media type information included in the received withdrawal message, and proceeds to step 805. In step 805, the PoC server calculates the number of remaining PoC clients using the identified one or more media types.

Thereafter, in step 807, the PoC server determines if the calculated number of remaining PoC clients using the one or more media types is one or less. When it is determined in step 807 that the calculated number of the remaining PoC clients using the one or more media types is one or less, the PoC server proceeds to step 808, in which the PoC server initiates a timer set for a preset time. In this case, the timer is initiated because a new PoC client using the one or more media types, which has been determined to be used by only one of the remaining PoC clients in the PoC session through steps 804 to 807, may join the PoC session before a session correction for deleting the one or more media types is performed.

Thereafter, in step 809 following step 808, the PoC server determines if the timer has reached the preset time. When the timer does not reach the preset time, the PoC server proceeds to step 810, in which the PoC server determines if a new PoC client using the identified one or more media types has joined the PoC session.

When it is determined that a new PoC client using the one or more media types identified in step 804 has joined in the PoC session before the timer has reached the preset time as a result of the determination of step 810, the PoC server returns to step 800 and all the currently supported media types remain supported, instead of performing a session correction operation. In contrast, when it is determined that a new PoC client using the one or more media types identified in step 804 has not joined in the PoC session before the timer has reached the preset time as a result of the determination of step 810, the PoC server returns to step 809 and repeats the determination operation of step 809 until the timer has reached the preset time.

Meanwhile, when it is determined that the timer has reached the preset time as a result of determination in step 809, the PoC server proceeds to step 811 in which the PoC server transmits a session correction message for deleting the one or more media types used by the one remaining PoC client to a PoC client using the one or more media types to be deleted.

Thereafter, in step 812, when receiving a final response message in response to the session correction message, the PoC server proceeds to step 813 in which the PoC server performs the session correction operation. In this case, as described above, the session correction represents deleting only the one or more media types that are only used by the one PoC client among media types supported in the PoC session.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A PoC server for managing one or more media types supported in a PoC session opened between the PoC server and one or more PoC clients, the PoC server comprising:
the PoC server for receiving a withdrawal message comprising media type information corresponding to one or more media types which are usable by the respective PoC client while participating in the PoC session, for identifying and storing the one or more media types from the media type information included in the withdrawal message when the withdrawal message is received, and for correcting the PoC session in such a manner as to exclude the identified one or more media types from among one or more media types used in the current PoC session when a number of remaining PoC clients using the identified one or more media types is one or less.

2. The PoC server as claimed in claim 1, wherein the PoC server initiates a timer for a preset time when the number of remaining PoC clients using the identified one or more media types is one or less, and continues to support the one or more media types used in the current PoC session, including the identified one or more media types, when a new PoC client using the identified one or more media types joins the PoC session before the timer has reached the preset time.

3. The PoC server as claimed in claim 2, wherein the PoC server corrects the PoC session in such a manner as to exclude the identified one or more media types from among the one or more media types used in the current PoC session, when a new PoC client using the identified one or more media types joins the PoC session after the timer has been initiated and has reached the present time.

4. The PoC server as claimed in claim 1, wherein, when the number of remaining PoC clients using the identified one or more media types is two or more, the PoC server continues to support the one or more media types used in the current PoC session, including the identified one or more media types.

5. The PoC server as claimed in claim 1, wherein, when the number of remaining PoC clients using the identified one or more media types is one or less, the PoC server transmits a session correction message for deleting the identified one or more media types from the PoC session to any remaining PoC clients, and then corrects the current PoC session in such a manner as to exclude the identified one or more media types from among the one or more media types used in the current PoC session when receiving a final response message from any remaining PoC client.

6. The PoC server as claimed in claim 5, wherein the session correction message comprises one of a SIP re-INVITE message and a SIP UPDATE message.

7. The PoC server as claimed in claim 1, wherein a media type comprises one or more of video, speech, image, text, and file.

8. A method for managing one or more media types supported in a PoC session opened between a PoC server and one or more PoC clients in a PoC server comprising the PoC server and the PoC clients, the method comprising:
   receiving a withdrawal message comprising media type information corresponding to one or more media types which are usable by the respective PoC client while participating in the PoC session;
   identifying and storing the one or more media types from the media type information included in the withdrawal message when the PoC server has received the withdrawal message;
   determining if a number of remaining PoC clients using the identified one or more media types is one or less; and
   correcting the PoC session in such a manner as to exclude the identified one or more media types from among one or more media types used in the PoC session when the number of remaining PoC clients using the identified one or more media types is one or less.

9. The method as claimed in claim 8, further comprising:
   initiating a timer for a preset time when the number of remaining PoC clients using the identified one or more media types is one or less, after the determining is performed; and
   continuing to support one or more media types used in the current PoC session, when a new PoC client using the identified one or more media types joins the PoC session before the timer has reached the preset time.

10. The method as claimed in claim 9, further comprising, after the initiating of the timer, performing the session correction when a new PoC client using the identified one or more media types joins the PoC session after the timer has reached the preset time.

11. The method as claimed in claim 8, further comprising, after the determining, continuing to support one or more media types used in the current PoC session, when the number of remaining PoC clients using the identified one or more media types is two or more.

12. The method as claimed in claim 8, further comprising, after the determining:
   transmitting a session correction message for deleting the identified one or more media types from the PoC session to any remaining PoC clients when the number of remaining PoC clients using the identified media type is one or less; and
   performing the session correction when the PoC server has received a final response message from any remaining PoC clients.

13. The method as claimed in claim 12, wherein the session correction message comprises one of a SIP re-INVITE message and a SIP UPDATE message.

14. The method as claimed in claim 8, wherein a media type comprises one or more of video, speech, image, text, and file.

15. A PoC user equipment for implementing management of one or more media types supported in a PoC session the PoC user equipment comprising:
   a user interface for outputting a signal according to an input of a PoC user;
   a data transmitter for at least one of transmitting and receiving packet data; and
   a PoC client for transmitting a PoC session withdrawal message which includes information about one or more media types supportable by the PoC client usable for participating in the PoC session to a PoC server through the data transmitter, when a PoC user inputs a PoC session withdrawal request through the user interface while the PoC is participating in the PoC session.

16. The PoC user equipment as claimed in claim 15, wherein, when the PoC client has received a session correction message from the PoC server through the data transmitter, the PoC client transmits a final response message to the PoC server through the data transmitter, the session correction message including information about one or more media types to be discontinued from being used in the current PoC session.

17. The PoC user equipment as claimed in claim 15, wherein, the information about the one or more media types supportable by the PoC client comprises information about one or more media types established through negotiations with the PoC server to be usable for participating in the PoC session.

18. The PoC user equipment as claimed in claim 15, wherein a media type comprises one or more of video, speech, image, text, and file.

* * * * *